(12) United States Patent
Schwartze et al.

(10) Patent No.: US 11,209,647 B2
(45) Date of Patent: Dec. 28, 2021

(54) DISPLAY DEVICE AND MOTOR VEHICLE FOR DISPLAYING AN IMAGE, HAVING A FILM TO DISPLAY AN IMAGE, HAVING AT LEAST ONE FURTHER ELECTRICAL COMPONENT

(71) Applicant: AUDI AG, Ingolstadt (DE)

(72) Inventors: Sebastian Schwartze, Ingolstadt (DE); Markus Klug, Ingolstadt (DE); André Schwager, Ingolstadt (DE); Muhammad Ali Kezze, Aachen (DE)

(73) Assignee: AUDI AG, Ingolstadt (DE)

( * ) Notice: Subject to any disclaimer, the term of this patent is extended or adjusted under 35 U.S.C. 154(b) by 121 days.

(21) Appl. No.: 16/649,537

(22) PCT Filed: Sep. 19, 2018

(86) PCT No.: PCT/EP2018/075382
§ 371 (c)(1),
(2) Date: Mar. 20, 2020

(87) PCT Pub. No.: WO2019/057788
PCT Pub. Date: Mar. 28, 2019

(65) Prior Publication Data
US 2020/0257116 A1 Aug. 13, 2020

(30) Foreign Application Priority Data
Sep. 22, 2017 (DE) ..................... 10 2017 216 845.5

(51) Int. Cl.
*B60K 35/00* (2006.01)
*G02B 27/01* (2006.01)

(52) U.S. Cl.
CPC .......... *G02B 27/0101* (2013.01); *B60K 35/00* (2013.01); *B60K 2370/1529* (2019.05)

(58) Field of Classification Search
CPC ........ G02B 2027/0196; G02B 27/0101; G02B 27/0103; G02B 2027/0118; G02B 2027/012; G02B 2027/0138; B60K 35/00
See application file for complete search history.

(56) References Cited

U.S. PATENT DOCUMENTS

| 6,654,070 | B1 | 11/2003 | Rofe |
| 2005/0084659 | A1 | 4/2005 | Dunkel |

(Continued)

FOREIGN PATENT DOCUMENTS

| CN | 105555567 A | 5/2016 |
| CN | 105717641 A | 6/2016 |

(Continued)

OTHER PUBLICATIONS

German Office Action dated Aug. 31, 2018, from German Application No. 10 2017 216 845.5, 8 pages.

(Continued)

*Primary Examiner* — Ryan D Howard
(74) *Attorney, Agent, or Firm* — Staas & Halsey, LLP

(57) ABSTRACT

A display apparatus for displaying an image includes a semitransparent carrier element, and a film provided on the semitransparent carrier element for at least regionally displaying the image. The film incorporates electrical components of the display apparatus. Further, the display apparatus can be included in a motor vehicle.

18 Claims, 3 Drawing Sheets

(56) References Cited

U.S. PATENT DOCUMENTS

| | | | |
|---|---|---|---|
| 2015/0232030 A1* | 8/2015 | Bongwald | G02B 27/0093 348/115 |
| 2017/0010469 A1 | 1/2017 | Samec et al. | |
| 2017/0270636 A1 | 9/2017 | Shtukater | |

FOREIGN PATENT DOCUMENTS

| | | |
|---|---|---|
| CN | 106324839 A | 1/2017 |
| DE | 10 2011 083 662 | 4/2013 |
| DE | 10 2012 000 568 | 7/2013 |
| DE | 10 2014 005 976 | 9/2014 |
| DE | 10 2013 210 887 | 12/2014 |
| DE | 10 2014 204 691 | 9/2015 |
| DE | 10 2015 016 281 | 6/2017 |
| DE | 10 2017 216 845.5 | 9/2017 |
| EP | 3 006 239 | 4/2016 |
| WO | 2016/142579 | 9/2016 |
| WO | 2017/026454 A1 | 2/2017 |
| WO | PCT/EP2018/075382 | 9/2018 |

OTHER PUBLICATIONS

German Office Action dated Dec. 20, 2019, from German Application No. 10 2017 216 845.5, 1 page.

Yang et al., "Organic light-emitting devices integrated with solar cells: High contrast and energy recycling", Applied Physics Letters 90, Apr. 25, 2007, pp. 173507-1 to 173507-3.

International Search Report dated Dec. 13, 2018 from International Application No. PCT/EP2018/075382, 6 pages.

Chinese Office Action dated Jun. 25, 2021, from Chinese Application No. 201880061682.3, 6 pages.

Translation of International Preliminary Report on Patentability dated Mar. 26, 2020, from International Application No. PCT/EP2018/075382, 8 pages.

* cited by examiner

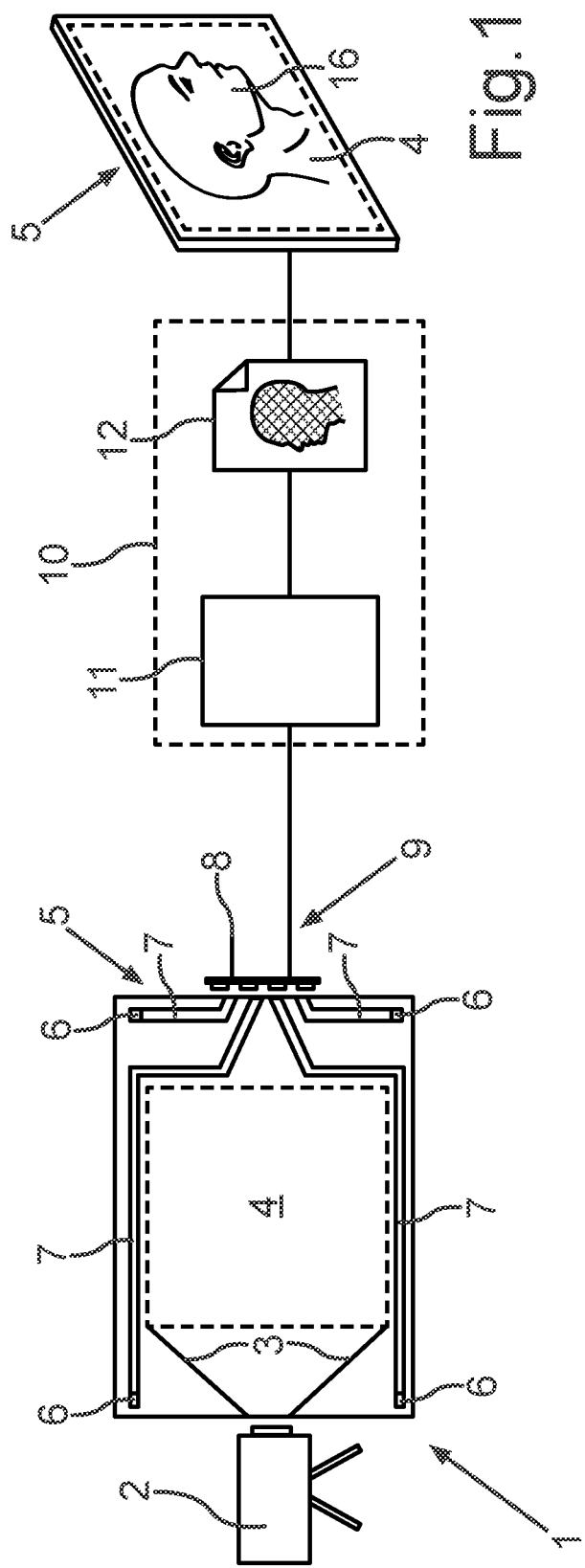

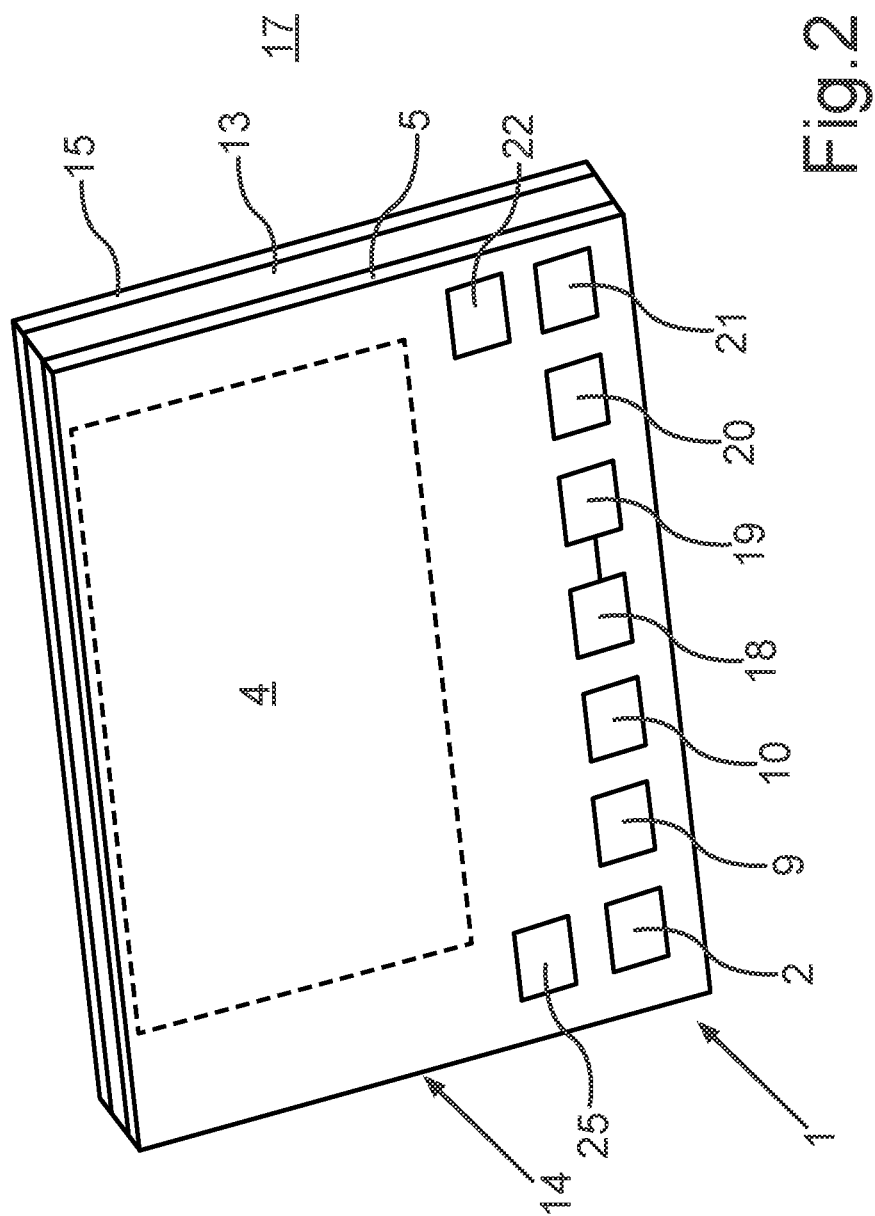

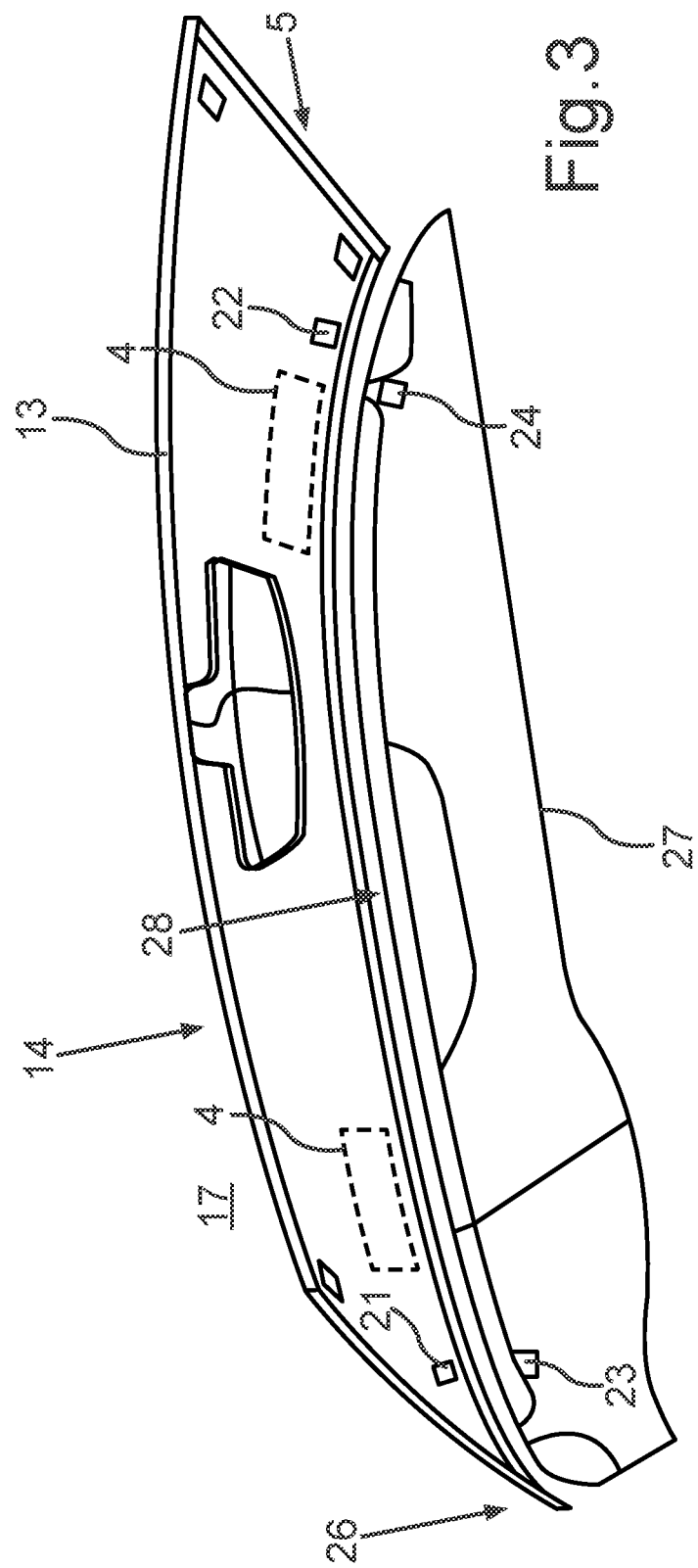

ial stage of International Application No. PCT/EP2018/075382, filed on Sep. 19, 2018. The International Application claims the priority benefit of German Application No, 10 2017 216 845.5 filed on Sep. 22, 2017. International Application No. PCT/EP2018/075382 and the German Application No. 10 2017 216 845.5 are incorporated by reference herein in their entirety.

DISPLAY DEVICE AND MOTOR VEHICLE FOR DISPLAYING AN IMAGE, HAVING A FILM TO DISPLAY AN IMAGE, HAVING AT LEAST ONE FURTHER ELECTRICAL COMPONENT

CROSS-REFERENCE TO RELATED APPLICATIONS

This application is a U.S. national stage of International Application No. PCT/EP2018/075382, filed on Sep. 19, 2018. The International Application claims the priority benefit of German Application No, 10 2017 216 845.5 filed on Sep. 22, 2017. International Application No. PCT/EP2018/075382 and the German Application No. 10 2017 216 845.5 are incorporated by reference herein in their entirety.

BACKGROUND

Described herein is a display apparatus for displaying an image having at least one semitransparent carrier element. Further, described herein is a motor vehicle having the display apparatus.

Display apparatuses including a projector are already known. The projector itself may then have electrical components arranged in it for displaying an image or recording surroundings. In addition, imaging films are known, in particular for volume holographic displays, that require further electrical components of the display apparatus to be separately installed and appropriately oriented. In particular, it is very time-consuming to orient and connect the applicable electrical components. A system compiled in this manner has high associated costs, in particular, and is susceptible to mechanical deformation and/or to movement of the individual components relative to one another.

SUMMARY

Described herein is a display apparatus and a motor vehicle by use of which reliable operation of the display apparatus can be fulfilled.

This is achieved by a display apparatus and by a motor vehicle as described herein.

One aspect described herein relates to a display apparatus for displaying an image. The display apparatus has at least one semitransparent carrier element. At least regions of a film for displaying at least regions of the image are arranged on the carrier element. The film incorporates at least one further electrical component of the display apparatus.

As a result, it is possible for the display apparatus to be provided as a subassembly and for example for easy maintenance and/or easy installation of the display apparatus to be able to be performed. In addition, it is not possible for the individual components to move or be shifted relative to one another, for which reason complicated alignment is likewise dispensed with. In particular, it is furthermore possible to arrive at a situation in which, as a result of the "closed system", the display apparatus has improved protection against environmental influences, such as for example dirt or water. In particular, it is likewise possible for heat dissipation to be performed via the carrier element, for example. Owing to the incorporation of the at least one further electrical component, improved use of space and improved reflection, in particular in the film, can be achieved. The incorporation of the at least one further electrical component into the film therefore fulfills reliable operation of the display apparatus.

It is possible for the carrier element and the film to be produced in a sandwich design. In other words, the carrier element and the film can be adhesively bonded to one another, for example. It is likewise possible for the film to be enclosed by two carrier elements. In this case too, a sandwich design can therefore be achieved. In particular, this allows the film to have improved protection against environmental influences. In addition, this sandwich design likewise allows a protective layer to be included as well, so that the display apparatus, in particular the semitransparent carrier element, is provided as a type of safety-glass pane, which in particular allows the display apparatus to be used as a window of the motor vehicle in motor vehicle construction. In addition, it is possible for the film and/or the carrier element to have a further LCD film, as a result of which the LCD film can be used to perform shading, so that the displayed image is perceptible to a person in an improved manner. For example, there can furthermore be provision for the LCD film to be arranged on a carrier element as well, the LCD film being dimmable on a pixel-by-pixel basis, so that depth information in the film is perceptible to the person in an improved manner. In particular, the LCD film can dim only the regions on which an image or parts of the image are also presented, so that it is still possible for the person to see through the regions where no image is presented. In particular, there can be provision for the displayed image to be able to be presented as augmented reality. In other words, a person seeing the image can likewise perceive the surroundings of the display apparatus through the at least semitransparent carrier element. The image is displayed on the film and the surroundings behind the film are nevertheless perceptible to the person. In particular, this allows for example information about the surroundings, for example a temperature or a speed of the motor vehicle, to be displayed as augmented reality. There can furthermore in particular be provision for the displayed image to be a three-dimensional image. Thus, the image presented can be a hologram. By way of example, multiple films can, to this end, be used for displaying an image, in order to produce a depth effect and, as a result, a three-dimensional image. Further, a volume hologram can also be used for the depth effect. The film having the at least one further electrical component is in particular of integral design. In particular, there can be provision for the at least one further electrical component to be encapsulated or pressed into the film. This allows the display apparatus to be provided for motor vehicle construction, and means that it merely needs to be arranged on a motor vehicle subassembly, for example. A complicated installation process to mount or arrange the display apparatus is therefore dispensed with.

According to one advantageous configuration, a camera of the display apparatus for capturing surroundings of the display apparatus can be incorporated in the film as a further electronic component. In particular, this also allows the film to be configured as an image-recording film and therefore to capture the surroundings of the display apparatus. In particular, for example movements of a person in front of the display apparatus can be captured by the camera, so that for example control of the display apparatus or of further components, for example of a motor vehicle, can also be brought about by use of the display apparatus. This allows reliable and improved operation of the display apparatus to be brought about by use of the camera as a further electrical component.

It is likewise advantageous if a light source of the display apparatus for producing light rays for the film is incorporated in the film as a further electrical component. By way of example, reflection and/or refraction and/or diffraction in the film can be used to route the light rays produced from the light source to the imaging region of the film, so that a volume holographic display is produced. This allows the light source to be arranged reliably within the film, so that more reliable operation and simple installation of the display apparatus can be brought about.

It is furthermore advantageous if a control device of the display apparatus for controlling the display apparatus is incorporated in the film as a further electrical component. The control device can be used for example to process information relating to the image and for example to provide appropriate control signals for a light source, so that the image can be displayed appropriately on the film. It is likewise possible for the control device to be able to be used for example to appropriately process information of a camera capturing surroundings of the display apparatus. The film having the control device is provided, which brings about more reliable operation and simplified installation of the display apparatus.

Further, it has been found to be advantageous if at least one electrical power supply element of an electrical power supply of the display apparatus for supplying the display apparatus with electric power is incorporated in the film as a further electrical component. This allows the display apparatus also to be equipped with an integrated power supply element, so that the display apparatus is provided with the electric power that it needs by the integrated power supply element. Overall, this allows reliable operation and simplified installation of the display apparatus to be brought about.

It is furthermore advantageous if at least one solar cell element is incorporated in the film as the at least one electrical power supply element for the purpose of electrical power generation in the display apparatus. In particular, this allows sunlight rays to be used to generate electric power that can be used to operate the display apparatus. In particular, this allows the display apparatus to be operated independently of an external power source of the display apparatus. There can furthermore be provision for electrical lines likewise to be incorporated in the film as a well as still further electrical components, for example for transmitting power from the solar cell element to the film. This allows the display apparatus to be provided as an energy self-sufficient subassembly without additional electrical power supply elements needing to be installed on the display apparatus or display-apparatus-external power supply elements needing to be provided. This allows reliable and energy self-sufficient operation to be brought about with less installation complexity for the display apparatus.

According to a further advantageous configuration, at least one induction element and/or an electrical contact element can be integrated in the film as the at least one electrical power supply element, wherein electric power from a further induction element is receivable by use of the induction element and/or electric power from a further contact element is receivable by use of the electrical contact element. In particular, there can be provision for the further induction element and/or the further contact element to be produced at a coupling point between the display apparatus and an accessory, which may in particular be a motor vehicle subassembly. Appropriate electrical lines for the display apparatus can likewise be incorporated in the film as still further electrical components. This allows simplified power transmission to the display apparatus; so that the display apparatus can be reliably operated.

Further, it has been found to be advantageous if a communication device of the display apparatus for receiving, in particular for wirelessly receiving, information at least about the image is incorporated in the film as a further electrical component. By way of example, the communication device can be a data receiving element that can be used to receive the information about at least the image. By way of example, this can be effected by use of Bluetooth and/or Wi-Fi and/or by use of optical communication devices. In particular, the communication device can also be used to receive further information, for example information about a speed of the motor vehicle or an ambient temperature, which can then also be presented in the image, for example as augmented reality, as well. It is likewise possible for the communication device to be able to be used to convey information of the display apparatus, for example captured information of a camera of the display apparatus or an operating status of the display apparatus; to a display-apparatus-external device by use of a network. This allows the display apparatus to be provided using reduced complexity, so that reliable operation of the display apparatus can be brought about.

A further aspect described herein relates to a motor vehicle having at least one display apparatus according to one of the preceding aspects. The motor vehicle is, for example, in the form of a passenger vehicle.

In one advantageous configuration of the motor vehicle, the carrier element of the display apparatus can be in the form of at least one window of the motor vehicle. For example, the window can then be provided as an accessory of a motor vehicle subassembly. By way of example, the window can be a windshield and the motor vehicle subassembly can be a dashboard. The windshield can then be arranged for example on the dashboard, with appropriate coupling components for example being installed on the dashboard, for example at a point of coupling to the window, in order to be able to bring about reliable operation of the display apparatus on the motor vehicle subassembly.

Advantageous configurations of the display apparatus should be regarded as advantageous configurations of the motor vehicle. For this reason, the applicable developments of the motor vehicle according to the disclosure are not described again here.

BRIEF DESCRIPTION OF THE DRAWINGS

These and other aspects and advantages will become more apparent and more readily appreciated from the following description of example embodiments, taken in conjunction with the accompanying drawings, of which:

FIG. 1 is a schematic perspective view of an embodiment of a display apparatus having a plurality of integrated electrical components;

FIG. 2 is a further schematic perspective view of an embodiment of the display apparatus having a plurality of integrated electrical components; and FIG. 3 is a schematic perspective view of an embodiment of a detail from a motor vehicle having an embodiment of the display apparatus.

DETAILED DESCRIPTION

The example embodiments explained below are merely example. In the example embodiments, the described components of the embodiments are each individual features that should be considered independently of one another, that each also develop the disclosure independently of one another and hence that should also be regarded as part of the disclosure individually or in a combination other than that shown. In addition, the embodiments described are also able to be supplemented by other features from those already described.

In the drawings, elements having the same function are each provided with the same reference signs.

FIG. 1 shows a schematic perspective view of an embodiment of a display apparatus 1. The display apparatus 1 has a light source 2 that can be used to project light rays 3 onto an imaging area 4 of a film 5.

In the example embodiment, the film 5 is presented in square form, for example. The respective corners of the film 5 have camera elements 6 arranged in them that use optical fibers 7 to transmit captured light rays to a camera device 8 of the display apparatus 1. For example, the camera elements 6 and the camera device 8 form a camera 9. The camera 9 can be used to capture surroundings 17 (FIG. 2) of the display apparatus. By way of example, movements of a person can be captured by the camera 9, the movements being able to be used to control the display apparatus 1 and/or further components of a motor vehicle 26 (FIG. 3).

Further, the display apparatus 1 can have a control device 10 that can be used to control the display apparatus 1. By way of example, the camera 9 here can send the information to a computer unit 11 of the control device 10, which then produces a three-dimensional image model, for example, in an imaging unit 12. This model can then in turn be presented as an image 16 on the film 5, for example in the imaging region 4.

The image 16 can, for example, be presented as augmented reality, so that the surroundings 17 of the display apparatus 1 and the image 16 are perceptible to a person. The image 16 can, for example, be presented as a three-dimensional image 16, for example, as a hologram.

FIG. 2 shows a further schematic perspective view of an embodiment of the display apparatus 1. The film 5 is arranged on a carrier element 13, which is in semitransparent form, for example. For example, regions of the film 5 can be arranged on the carrier element 13. There is provision for the film 5 to incorporate at least one further electrical component 2, 9, 10, 18, 19, 20, 21, 22, 25 of the display apparatus 1.

For example, the carrier element 13 can be produced in a sandwich design, so that for example a further carrier element can be arranged on the film 5. For example, the display apparatus 1 can then be in the form of a window 14 of a motor vehicle 26 (FIG. 3). For example, the window 14 can include a safety glass, for example, so that it is suitable for motor vehicle construction.

Further, there can be provision for an LCD film 15 to be arranged on the carrier element 13 and/or on the film 5 and to be able to generate shading, so that the image 16 can be presented on the imaging region 4 in an improved manner or is perceptible to the person in an improved manner. For example, there can furthermore be provision for the LCD film 15 to be arranged on a carrier element 13 as well, the LCD film being dimmable on a pixel-by-pixel basis, so that depth information of the film 5 is perceptible to the person in an improved manner. For example, the LCD film 15 can dim only the regions on which an image 16 or parts of the image 16 are also presented, so that the person can continue to see through the regions where no image 16 is presented.

FIG. 2 furthermore shows that at least one electrical power supply element 18 of an electrical power supply 19 of the display apparatus 1 for suppling the display apparatus 1 with electric power can be incorporated in the film 5 as well.

Further, there can be provision for at least one solar cell element 20 to be incorporated in the film 5 as the at least one electrical power supply element 18 for the purpose of electrical power supply in the display apparatus 1.

Further, there can be provision for at least one induction element 21 and/or an electrical contact element 22 to be incorporated in the film 5 as the at least one electrical power supply element 18. The induction element 21 can be used to receive electric power from a further induction element 23 (FIG. 3), and/or electric power from a further contact element 24 (FIG. 3) can be receivable by use of the electrical contact element 22.

Further, the film 5 can include a communication device 25 for receiving, for example for wirelessly receiving, for example by use of Bluetooth or WiFi, information at least about the image 16, wherein the communication device 25 is incorporated in at least regions of the film 5. It is furthermore possible for the communication device 25 to be able to be used to transmit, for example wirelessly, further information, for example from the camera 9 and/or an operating status of the display apparatus 1, to a further component, for example, of the motor vehicle.

FIG. 3 shows a further schematic perspective view of an embodiment of a detail from a motor vehicle 26. The motor vehicle 26 in the example includes the display apparatus 1 and a motor vehicle subassembly 27. Further, the carrier element 13 is in the form of a window 14, for example in the form of a windshield. For example, the further induction element 23 and the further contact element 24 may be arranged at a coupling point 28 between the window 14 and the motor vehicle subassembly 27, so that electric power can be transmitted to the display apparatus 1. It is also possible for further elements for control or transmission of information to or from the display apparatus to be arranged on the motor vehicle subassembly 27, for example at the coupling point 28.

Overall, the examples show how the display apparatus allows the incorporation of the imaging elements and electronics into the window.

A description has been provided with reference to various examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A display device for displaying an image, comprising:
   an at least semitransparent carrier element configured as a windshield of a motor vehicle;
   a film provided on the at least semitransparent carrier element to at least regionally display the image;
   electrical components integrated in the film, the electrical components including:
      at least one electrical power supply element of an electrical power supply configured to supply the display device with electrical power, the at least one electrical power supply element including a solar cell element, disposed outside a region of the film which displays the image, configured to generate electrical power for the display device, and
      a controller, disposed outside the region of the film which displays the image, configured to control the display device; and a liquid crystal display (LCD) film, provided on the at least semitransparent carrier element and/or the film, configured to shade the region of the film which displays the image.

2. The display device according to claim 1, wherein the electrical components further include a light source configured to generate light rays for the film.

3. The display device according to claim 1, wherein
the at least one electrical power supply element includes at least one induction element and/or an electrical contact element.

4. The display device according to claim 3, wherein
the at least one induction element is configured to receive electric power from a further induction element, and/or
the electrical contact element is configured to receive electric power from a further contact element.

5. The display device according to claim 1, wherein the electrical components further include a communication device configured to receive information at least about the image.

6. The display device according to claim 5, wherein the communication device is configured to wirelessly receive the information at least about the image.

7. The display device according to claim 1, wherein the electrical components further include a camera configured to capture surroundings of the display device.

8. The display device according to claim 7, wherein the electrical components further include a communication device configured to receive information captured by the camera and to wirelessly transmit the information to an external device via a wireless network.

9. The display device according to claim 1, wherein the LCD film is configured to be dimmable on a pixel-by-pixel basis to dim the region of the film which displays the image while other regions of the film are not dimmed.

10. A motor vehicle, comprising:
a windshield; and
a display device, including:
an at least semitransparent carrier element configured as the windshield,
a film provided on the at least semitransparent carrier element to at least regionally display the image,
electrical components integrated in the film, the electrical components including:
at least one electrical power supply element of an electrical power supply configured to supply the display device with electrical power, the at least one electrical power supply element including a solar cell element, disposed outside a region of the film which displays the image, configured to generate electrical power for the display device, and
a controller, disposed outside the region of the film which displays the image, configured to control the display device, and
a liquid crystal display (LCD) film, provided on the at least semitransparent carrier element and/or the film, configured to shade the region of the film which displays the image.

11. The motor vehicle according to claim 10, wherein the electrical components further include a light source configured to generate light rays for the film.

12. The motor vehicle according to claim 10, wherein
the at least one electrical power supply element includes at least one induction element and/or an electrical contact element.

13. The motor vehicle according to claim 12, further comprising:
a dashboard; and
a further induction element provided on the dashboard configured to transmit electric power to the at least one induction element and/or a further contact element provided on the dashboard configured to transmit electric power to the electrical contact element.

14. The motor vehicle according to claim 10, wherein the electrical components further include a communication device configured to receive information at least about the image.

15. The motor vehicle according to claim 14, wherein the communication device is configured to wirelessly receive the information at least about the image.

16. The motor vehicle according to claim 10, wherein the electrical components further include a camera configured to capture surroundings of the display device.

17. The motor vehicle according to claim 16, wherein the electrical components further include a communication device configured to receive information captured by the camera to and to wirelessly transmit the information to an external device via a wireless network.

18. The motor vehicle according to claim 10, wherein the LCD film is configured to be dimmable on a pixel-by-pixel basis to dim the region of the film which displays the image while other regions of the film are not dimmed.

* * * * *

UNITED STATES PATENT AND TRADEMARK OFFICE
CERTIFICATE OF CORRECTION

Page 1 of 1

PATENT NO.          : 11,209,647 B2
APPLICATION NO.     : 16/649537
DATED               : December 28, 2021
INVENTOR(S)         : Sebastian Schwartze et al.

It is certified that error appears in the above-identified patent and that said Letters Patent is hereby corrected as shown below:

In the Specification

Column 1, Line 13, Delete "No," and insert --No.--.

In the Claims

Column 8, Line 41, Delete "the camera to and to" and insert --the camera and to--.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*